United States Patent
Noble et al.

(10) Patent No.: US 7,668,370 B2
(45) Date of Patent: Feb. 23, 2010

(54) SEGMENTING A SERIES OF 2D OR 3D IMAGES

(75) Inventors: Nicholas Michael Ian Noble, London (GB); Lieuwe Jan Spreeuwers, Amersfoort (NL); Marcel Breeuwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 425 days.

(21) Appl. No.: 10/527,862

(22) PCT Filed: Sep. 5, 2003

(86) PCT No.: PCT/IB03/03898

§ 371 (c)(1), (2), (4) Date: Mar. 16, 2005

(87) PCT Pub. No.: WO2004/027712

PCT Pub. Date: Apr. 1, 2004

(65) Prior Publication Data

US 2005/0271271 A1    Dec. 8, 2005

(30) Foreign Application Priority Data

Sep. 19, 2002    (EP) .................................. 02078922

(51) Int. Cl.
G06K 9/34    (2006.01)
G06K 9/00    (2006.01)
(52) U.S. Cl. ...................... 382/173; 382/103; 382/131
(58) Field of Classification Search .................. 382/173
See application file for complete search history.

(56) References Cited

U.S. PATENT DOCUMENTS

| | | | | |
|---|---|---|---|---|
| 4,953,554 A | * | 9/1990 | Zerhouni et al. | 600/410 |
| 5,381,791 A | * | 1/1995 | Qian | 600/436 |
| 5,435,310 A | * | 7/1995 | Sheehan et al. | 600/416 |
| 5,680,862 A | * | 10/1997 | Song et al. | 600/410 |
| 5,757,953 A | * | 5/1998 | Jang | 382/132 |
| 5,800,355 A | * | 9/1998 | Hasegawa | 600/436 |
| 5,982,909 A | * | 11/1999 | Erdem et al. | 382/103 |
| 6,120,453 A | * | 9/2000 | Sharp | 600/463 |

(Continued)

OTHER PUBLICATIONS

Malassiotis et al., Tracking the Left Ventricle in Echocardiographic Images by Learning Heart Dynamics, Mar. 1999, IEEE Transactions of Medical Imaging, vol. 18, No. 3, pp. 282-290.*

(Continued)

*Primary Examiner*—Bhavesh M Mehta
*Assistant Examiner*—David P Rashid

(57) ABSTRACT

The invention relates to an apparatus for segmenting a series of 2D or 3D images obtained by monitoring a patient's organ or other body part, wherein a first segmentation is carried out on a first image of the series of images and wherein the first segmentation is used for the subsequent segmentation of the remainder of images of the series of images. A series of transformations are carried out wherein each separate transformation embodies a fitting operation between two images of the series of images, and wherein substantially all images of the series of images are subject of such a transformation. The first segmentation on the first image of the series of images is modified and subsequently applied to any further image of the series of images according to the transformation or sequence of transformations that fits the first image to a further image of the series of images.

13 Claims, 2 Drawing Sheets

U.S. PATENT DOCUMENTS

| | | | | |
|---|---|---|---|---|
| 6,195,445 | B1* | 2/2001 | Dubuisson-Jolly et al. | 382/107 |
| 6,346,124 | B1* | 2/2002 | Geiser et al. | 600/450 |
| 6,353,679 | B1* | 3/2002 | Cham et al. | 382/228 |
| 6,396,961 | B1* | 5/2002 | Wixson et al. | 382/294 |
| 2001/0048753 | A1* | 12/2001 | Lee et al. | 382/103 |
| 2002/0072670 | A1* | 6/2002 | Chenal et al. | 600/449 |
| 2002/0072671 | A1* | 6/2002 | Chenal et al. | 600/450 |

OTHER PUBLICATIONS

E.G. Caini et al; "Analysis of Left Ventricular Wall Motion Using Dynamic Alignment", Piscataway, NJ, IEEE, 2000, pp. 695-698, XP 010528659.

J. Benois-Pineau et al; "Motion and Structure Based Image Segmentation for Object Oriented Time-Varying Sequences Coding", Pattern Recognition, 1994, vol. 1, Confer.

M. Pardas et al; "Motion Estimation Based Tracking of Active Contours", Pattern Recognition Letters, North-Holland Publ. Amsterdam, NL, vol. 22, No. 13, Nov. 2001, pp. 144.

T. O'Donnell et al; "Multi-Modality Model-Based Registration in the Cardiac Domain", Proceedings 2000 IEEE Conference on Computer Viion and Pattern Recognition. CVPR 2000. HIL.

* cited by examiner

SEGMENTING A SERIES OF 2D OR 3D IMAGES

The invention relates to a method and to an apparatus having means for segmenting a series of 2D or 3D images obtained of a patient's organ or other body part, wherein a first segmentation is carried out on a first image of the series of images and wherein the first segmentation is used for the subsequent segmentation of the remainder of images of said series of images.

Such a method and apparatus is known from U.S. Pat. No. 5,903,664, showing a cardiac segmentation system acquiring a series of images as slices through a volume, and as images at different time periods throughout a cardiac cycle. In this known system and method a first image of a series of images is segmented by making use of a threshold. The centroid of this image is used as a seed point in segmenting adjacent images. This is repeated for a number of images in order that all images are accordingly segmented.

It is an object of the invention to improve the reliability and versatility of the known method and apparatus for segmenting a series of 2D or 3D images, whereby the segmenting still can take place with little or without human intervention.

It is also an object of the invention to provide a method and apparatus, which allow for easy and swift comparison between different sets of images.

These and other objects of the invention which will become apparent from the discussion below, are accomplished in that while in use the apparatus of the invention carries out a series of transformations in relation to the images, wherein each separate transformation embodies a fitting operation between two images of said series of images, and wherein substantially all images of the series of images are subjected to such a transformation, whereby the first segmentation on the first image of the series of images is modified and subsequently applied to any further image of the series of images according to the transformation or sequence of transformations that fits the said first image to said further image of the series of images.

The invention is also embodied in the method and in software operated by the apparatus, which method and software are characterized in that in relation to the images a series of transformations are established wherein each separate transformation embodies a fitting operation between two images of said series of images, and wherein substantially all images of the series of images are subjected to such a transformation, and that the first segmentation on the first image of the series of images is modified and subsequently applied to any further image of the series of images according to the transformation or sequence of transformations that fits the said first image to said further image of the series of images.

It is envisaged that any type of segmentation can be applied initially as the first segmentation on the first image. This segmentation can be carried out either manually or (semi) automatically by means and methods that are known per se in the art. The result of this segmentation which can be moulded according to the needs of the user, is according to the invention simply and quickly propagated to the other images of the series of images.

The said transformation among the respective images of the series can be applied for instance between the said first image of the series of images and each of the further images of such series of images. It is, however, preferred that each transformation relates to adjacent or immediately successive images of the series of images. The differences between adjacent or immediately successive images of said series of images are rather limited allowing that the accuracy requirements of the transformation remain fairly limited.

An important benefit of the invention lies in that it proves particularly useful when there are two or more series of images, whereby the segmentation applied to the first series of images can also be applied to the other series of images. This allows for ease of comparison among the said series.

The just mentioned advantage is immediately apparent when the method is applied to, or the apparatus operates on series of images that are collected with different means of monitoring selected from the group Magnetic Resonance (MR), Computer Tomography (CT), Nuclear Medicine (NM) and Ultrasound (US).

It is further useful that the respective series of images, whether being collected with the same means of monitoring or with different means of monitoring, are collected at different times.

The method according to the invention applies to all types of organs and other patient's body parts. When the images, however, relate to a substantially sphere-like organ such as a heart, the apparatus, software and method according to the invention are preferably characterized in that prior to establishing the said series of transformations, the series of images are converted to a modified series of images showing the walls of the organ in a flat plane wherein the left and right part of said plane substantially correspond to the inside and outside of said organ, and that the said series of transformations are applied to the modified series of images. By this measure of converting the initial series of images to a modified series of images, the processing according to the invention can be substantially alleviated allowing for rapid processing of large amounts of images without sacrificing accuracy.

The invention shall hereafter be further elucidated with reference to the drawing.

The invention applies to processing of both 2D and 3D images. For medical diagnosis, therapy planning and monitoring of the effect of therapy it is often required to accurately segment various anatomical structures that are present in medical images of the patient. Medical image segmentation has therefore received considerable attention during the last few decades.

Many segmentation algorithms have been proposed, ranging from methods based on thresholding (see U.S. Pat. No. 5,903,664) to advanced methods such as 2D active-contour or 3D active-object based segmentation.

Whatever the type of segmentation, which may also include manual segmentation, the invention proposes an apparatus and method which make it easy to apply the selected segmentation to all images in a series of images or to several series of images, whereby it is only required to apply an initial segmentation to a selected first image of the series of images.

Figure 1:
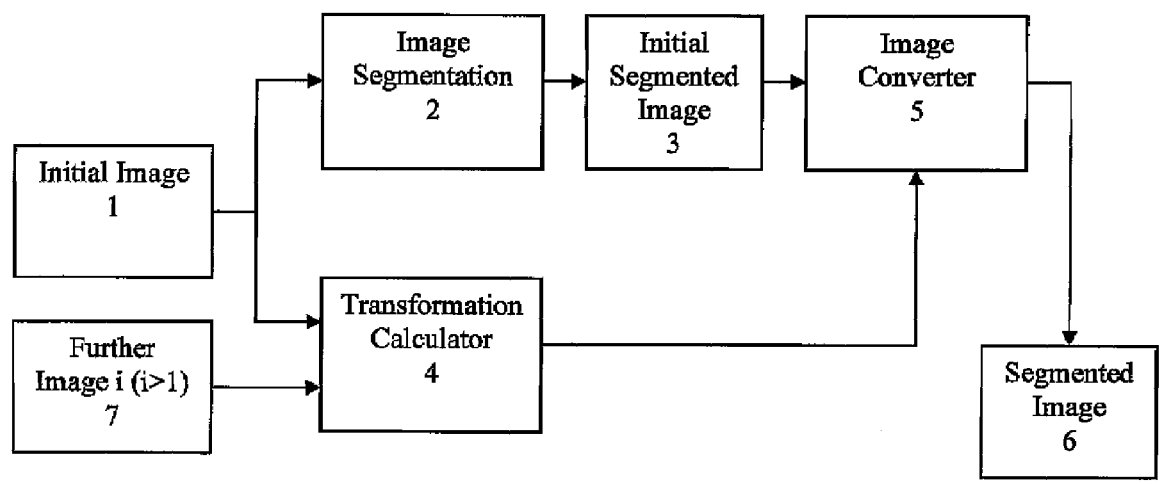
FIG. 1 shows a schematic flow sheet of the operation of an apparatus according to the invention.

With reference now to FIG. 1, the general working of the apparatus and method according to the invention is explained. An image 1 undergoes a segmentation in box 2 resulting in a desired segmented image 3. The said first image 1 and consecutively further images i, whereby i may range from 2 to n, are supplied to a box 4 in which a transformation $T_{1,i}$ is calculated in order to arrive at a best fit of image 1 and image i. This transform $T_{1,i}$ is supplied to a box 5, which also receives the initial segmented image 3 and which converts these both information flows into a segmented image 6 corresponding to the original image i. The apparatus of the invention repeats this process for every i in the range 2 to n, so that in relation to a region of interest of the concerning images, a series of transformations are established, wherein each separate transformation embodies a best fit between two images of said series of images, and wherein each image of the series of images is subject of such a transformation. Although FIG. 1 relates to each individual transformation among images such that always image 1 forms part thereof, it is also possible that each individual transformation relates to adjacent or—in other words—immediately successive images of the series of images.

The invention is also applicable when there are two or more series of images whereby the segmentation of the first series of images (which is based on the segmentation of the first image from this first series of images) applies to all series of images.

It is in this respect possible and at times advantageous that the respective series of images are collected with different means of monitoring the patient, which means are selected from the group MR, CT, NM and US. The respective series of images may also be collected at different times.

Figure 2:
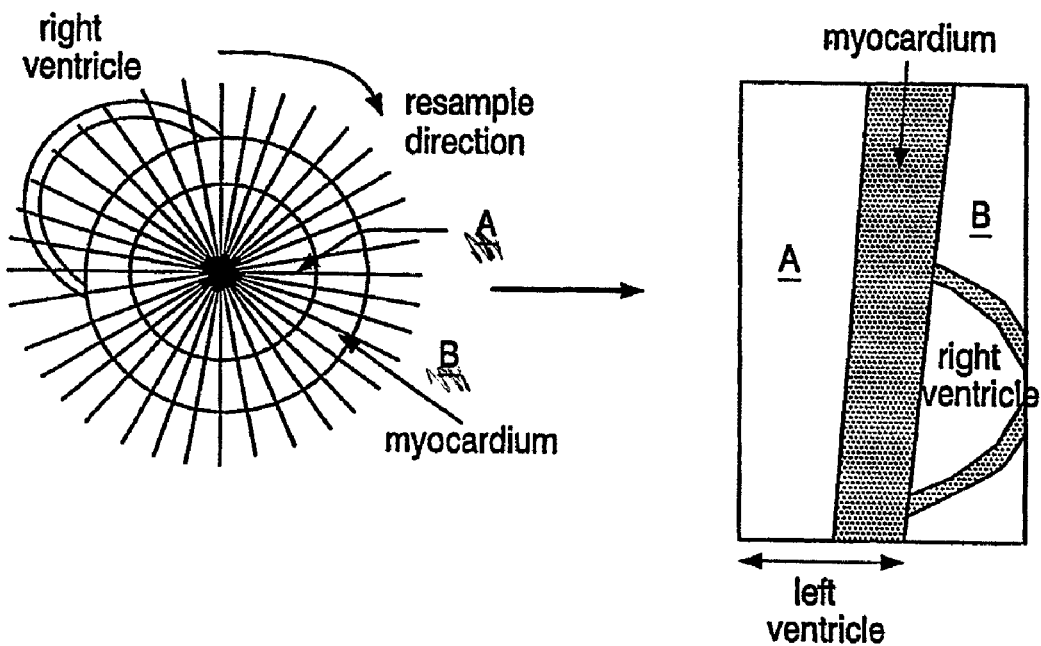
FIG. 2 shows schematically an image of a heart and a modified image thereof.

With reference to FIG. 2, it is shown that the images (one of which is shown in the left-hand part of FIG. 2) may relate to a substantially sphere-like organ such as a heart. In such a case, it is desirable that prior to establishing the above explained series of transformations, a conversion of the image of the heart shown at the left-hand part takes place to a modified image as shown in the right-hand part of FIG. 2. This type of transformation is known as a resample operation and results in a showing of the walls of the concerning organ in a flat plane, wherein the left- and right-hand part of said plane substantially correspond to the inside and outside of the concerning organ. The ease of working of the apparatus and method of the invention is highly supported by this prior operation allowing that the transformation can take place to the modified image which is simpler to operate. An example of this is shown with reference to FIG. 3.

Figure 3:
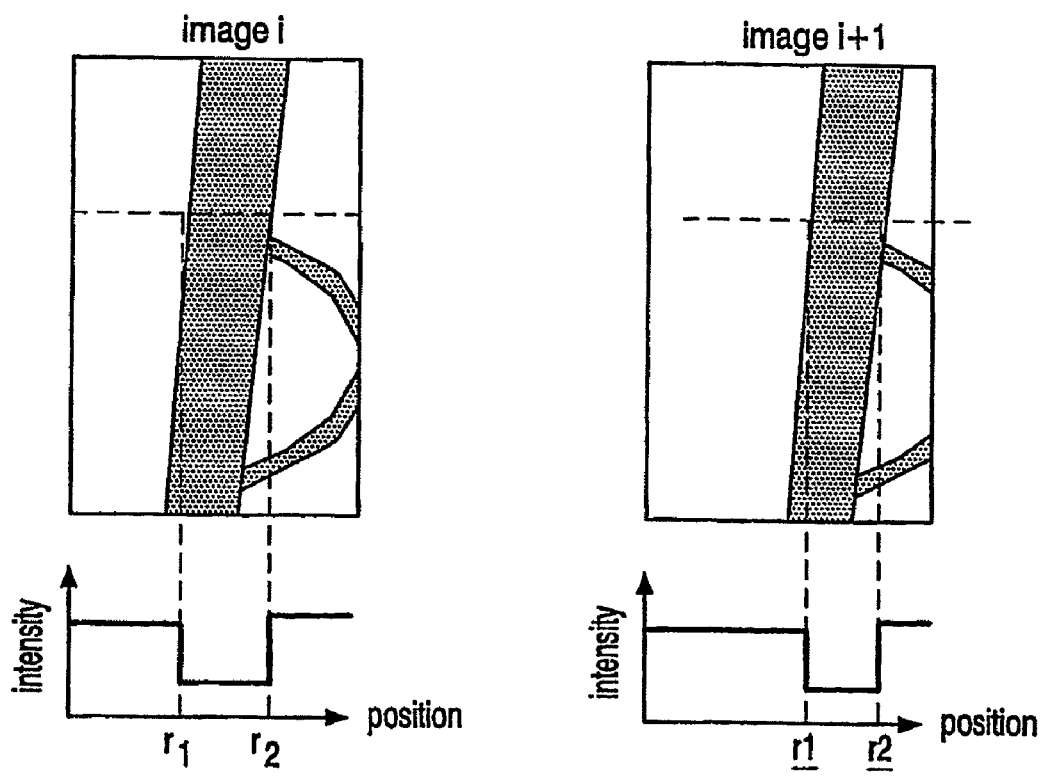
FIG. 3 shows the modified image of the heart in two subsequent images.

FIG. 3 shows at the left-hand part an image i and on the right-hand part a subsequent image i+1. The region of interest of these images is the so-called myocardium of the left ventricle of the heart, the position of which is indicated in the left-hand Figure by $r_1$-$r_2$. In the right-hand part of the Figure relating to image i+1 this position has changed to $\underline{r}_1$-$\underline{r}_2$. The change in position from $r_1$-$r_2$ to $\underline{r}_1$-$\underline{r}_2$ represents the transformation that fits image i to image i+1 and which is used for applying the segmentation of image i to image i+1.

It is remarked that the above merely represents one example of executing the transformation as part of the method according to the invention and that there are numerous other ways of executing this transformation within the scope and spirit of the invention as defined by the appended claims.

The invention claimed is:

1. An apparatus for segmenting a first series of 2D or 3D images obtained from a target object within a patient, comprising:
   a transform calculator which calculates a series of transformations, wherein each transformation comprises an operation for defining a best fit between two images of the first series of images, the transformations including: (1) a first transformation of the series of transformations between a first image of the series and a subsequent second image of the series and (2) a second transformation between the first and a subsequent third image;
   a segmenter which segments the first image of the first series is generated;
   an image converter which applies the first transformation to the segmentation of the first image to generate a second image segmentation corresponding to the second image and applies the second transformation to the first segmentation to generate a third image segmentation corresponding to the third images,
   wherein the segmentation of the first series of images is applied to a second series of images.

2. The apparatus according to claim 1, wherein each transformation relates one of the series of images to an adjacent one of the images of the first series of images.

3. The apparatus according to claim 1, wherein each of the first and second series of images are each collected form one or more of:
   a magnetic resonance (MR) imaging system, a computer tomography (CT) imaging system, a nuclear medicine (NM) imaging system and an ultrasound (US) imaging system.

4. The apparatus according to claim 1, wherein the first and second series of images are collected at different times.

5. The apparatus according to claim 1, wherein the images relate to a sphere-like organ and prior to establishing the first series of transformations, the first series of images is converted to a modified first series of images showings walls of the organ in a flat plane wherein opposing sides of said plane correspond to an inside and an outside of said organ, and that the said series of transformations are applied to the modified first series of images.

6. A method for segmenting a first series of 2D or 3D images obtained from a target object within a patient, the method comprising:
   with a processor, calculating a series of transformations in relation to the first series of images including at least: (1) a first transformation of the series of transformations best fitting a first of the images and a subsequent second one of the images and (2) a second transformation of the series of transformation best fitting the first image and a subsequent third one of the images;
   performing a segmentation on the first image of the first series of images to obtain a first segmented image;
   with a processor, applying the first transformation to the segmentation of the first image to generate a second segmentation corresponding to second of the images and applying the second transformation to the segmentation of the first image to generate a third segmentation corresponding to the third image; and
   at least one of storing the second and third segmented images in a memory and displaying the second and third segmented images on a display device,
   wherein the segmentation of the first series of images is applied to a second series of images.

7. The method according to claim 6, further comprising:
   collecting each of the first and second series of images with a different one of:
   magnetic resonance (MR) imaging system, a computer tomography (CT) imaging, a nuclear medicine (NM) imaging and ultrasound (US) imaging.

8. The method according to claim 6, wherein the first and second series of images are collected at different times.

9. The method according to claim 6, wherein the images relate to a sphere-like organ, the method further comprising:
   prior to establishing the series of transformations, converting the first series of images to a modified first series of images showings walls of the organ in a flat plane wherein opposing sides of said plane substantially correspond to an inside and an outside of said organ, and wherein the series of transformations are applied to the modified first series of images.

10. A method for segmenting a first series of 2D or 3D images, the method comprising:

with at least one processor, calculating a transformation between a first image and a second image of the first series of images to determine a first transformation of a series of transformations that best fits the first image and the second image;

performing a first segmentation of the first image of the first series of images to obtain a first segmented image according to a selected segmentation process;

with at least one processor, applying the first transformation to the first segmented image to generate a second segmented image corresponding to the second image;

with the at least one processor, calculating a second transformation between the first image and a third image of the first series of images which second transformation best fits the first image and the third image with the processor;

with the at least one processor, applying the second transformation to the first segmented image and to generate a third segmented image corresponding to the third image; and at least one of storing the second and third segmented images in a memory and displaying the second and third segmented images on a monitors, wherein the segmentation of the first series of images is applied to a second series of images.

11. The method of claim 10, further comprising:

calculating a series of the transformations among the first series of images prior to segmenting the first image, wherein each image of the series of images comprises a wall of an organ in a flat plane, opposing sides of the wall respectively corresponding to inside and outside the organ.

12. The method of claim 11, further including resampling the first series of images.

13. A method for segmenting a first series of 2D or 3D images, the method comprising:

with one or more processors, calculating a first transformation between a first image and a second image of the first series of images to determine a first transformation of a series of transformations that best fits the first image and the second image;

with the one or more processors, calculating a second transformation between the first image and a successive third image of the first series of images which second transformation best fits the first image and the third image;

with the one or more processors, performing a first segmentation of the first image of the first series of images to obtain a first segmented image according to a selected segmentation process;

with the one or more processors, applying the first transformation to the first segmented image to generate a second segmented image corresponding to the second image;

with the one or more processors, applying the second transformation to the first segmented image to generate a third segmented image corresponding to the third image;

at least one of storing the segmented images in a memory and displaying the second segmented images on a display device, wherein the segmentation of the first series of images is applied to a second series of images.

* * * * *